US012787936B2

(12) United States Patent
Eberly

(10) Patent No.: US 12,787,936 B2
(45) Date of Patent: Nov. 10, 2026

(54) CONVERSION SYSTEM FOR ZERO TURN LAWN EQUIPMENT

(71) Applicant: Troy Eberly, Hartville, OH (US)

(72) Inventor: Troy Eberly, Hartville, OH (US)

( * ) Notice: Subject to any disclaimer, the term of this patent is extended or adjusted under 35 U.S.C. 154(b) by 539 days.

(21) Appl. No.: 18/357,367

(22) Filed: Jul. 24, 2023

(65) Prior Publication Data

US 2024/0057524 A1 Feb. 22, 2024

Related U.S. Application Data

(60) Provisional application No. 63/371,941, filed on Aug. 19, 2022.

(51) Int. Cl.
*A01D 69/00* (2006.01)
*A01D 67/04* (2006.01)
*A01D 101/00* (2006.01)

(52) U.S. Cl.
CPC ........... *A01D 69/002* (2013.01); *A01D 67/04* (2013.01); *A01D 69/005* (2013.01); *A01D 2101/00* (2013.01)

(58) Field of Classification Search
CPC .... A01D 69/002; A01D 67/04; A01D 69/005; A01D 2101/00; A01D 34/64
See application file for complete search history.

(56) References Cited

U.S. PATENT DOCUMENTS 8,523,225 B2 * 9/2013 Reinke .................... B60R 21/13 280/756
2006/0230734 A1 * 10/2006 Wouw .................... A01D 34/76 56/13.5
2007/0015619 A1 * 1/2007 Sasahara ............. B60K 17/046 475/178
2007/0245726 A1 * 10/2007 Iwaki ..................... B62D 9/002 60/487
2009/0182470 A1 * 7/2009 Garvey ................ A01D 34/662 701/50
2022/0379781 A1 * 12/2022 Kucera .................. A01D 34/64

* cited by examiner

*Primary Examiner* — William D Hutton, Jr.
*Assistant Examiner* — Jose A. Martinez
(74) *Attorney, Agent, or Firm* — Harpman & Harpman

(57) ABSTRACT

A directional control conversion and method for a self-propelled zero turn two-wheel drive center deck lawn care vehicles that changes the vehicle's directional orientation and adaptive use with a variety of front equipment attachments. The method provides custom components that allows the operator's rear drive zero turn equipment to be driven from the front caster wheel position thus reversing the operator's orientation and primary direction of travel of the lawn care vehicle by control lever extension and custom adaptive assemblies for auxiliary forward attachment mounting and power operational remote controls.

7 Claims, 7 Drawing Sheets

CONVERSION SYSTEM FOR ZERO TURN LAWN EQUIPMENT

This application claims the benefit of U.S. Provisional Application No. 63/371,941, filed Aug. 19, 2022.

BACKGROUND OF THE INVENTION

1. Technical Field

This invention is related to the conversion of self-propelled riding standing or sitting lawn care vehicles having independent direct drive rear drive wheels and a centrally positioned under the frame mower deck.

2. Description of Prior Art

There are no known prior art conversions for two-wheel direct drive lawncare vehicles that allows for a conversion of vehicle operator's position and control to allow for the addition of conventional front attachments. There are prior art front adaptive attachments for existing lawncare equipment that maintain the operator's original drive and control positions.

SUMMARY OF THE INVENTION

A conversion assembly and method for self-propelled zero turn lawncare equipment that allows for the use for a variety of front mounted attachments on a rear wheel driven and controlled zero turn lawncare vehicle. Custom conversion control and drive assemblies are mounted to the front and rear of the conventional lawncare vehicle switching the operator's control and vehicle's operational direction from back to front without extensive modifications of the machine by maintaining the original drive wheels and vehicle's caster wheels.

DETAILED DESCRIPTION OF THE INVENTION

Figure 1:
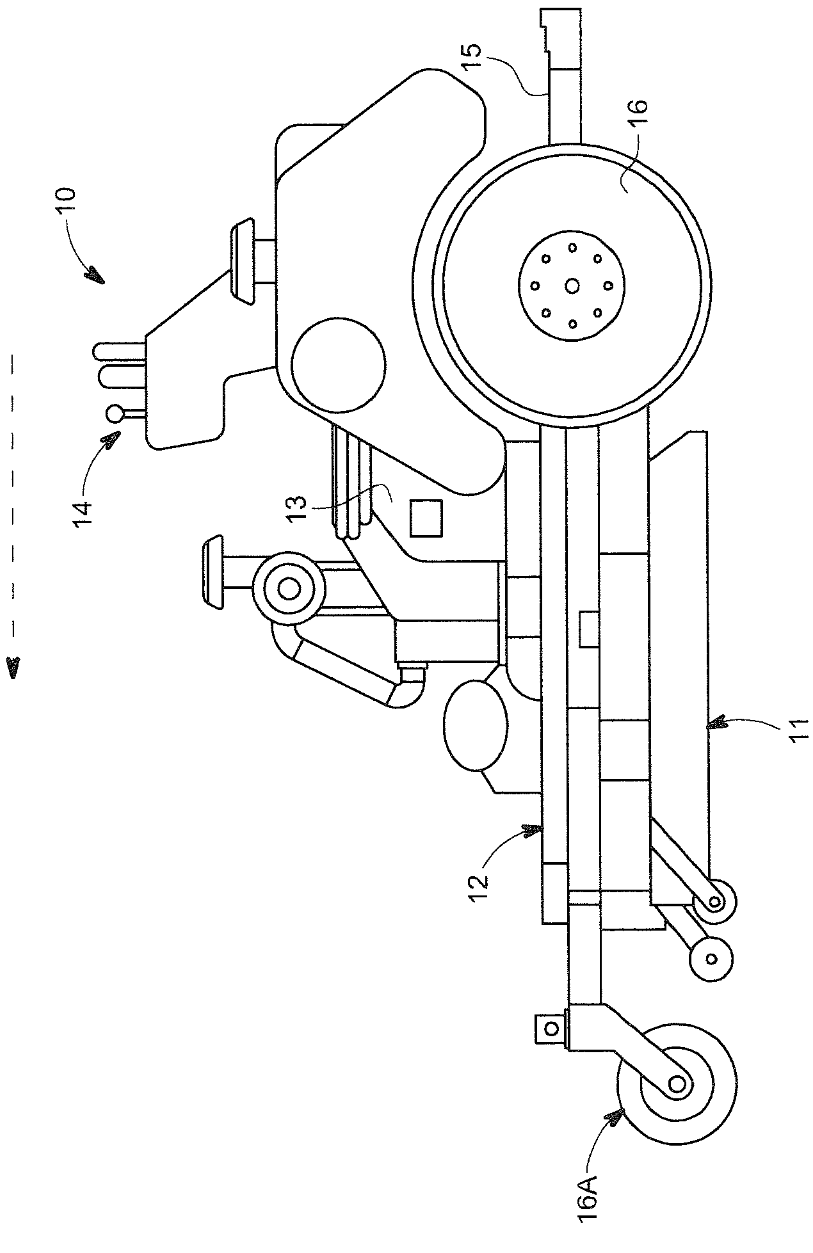
FIG. 1 is a side elevational view of a conventional rear drive and steering zero turn lawncare equipment vehicle.

Referring to FIG. 1 of the drawings, a conventional two-wheel rear driven zero turn lawncare equipment vehicle 10 can be seen with an underframe centered position mowing deck assembly 11. A frame 12 supports an engine 13 and a set of controls 14 with an operator's stand 15 extending therefrom. A set of hydrostatic pumps 16A drive independent drive wheels 16 provides proportion in steering with a forward positioned front caster wheel set 16A.

Figure 2:
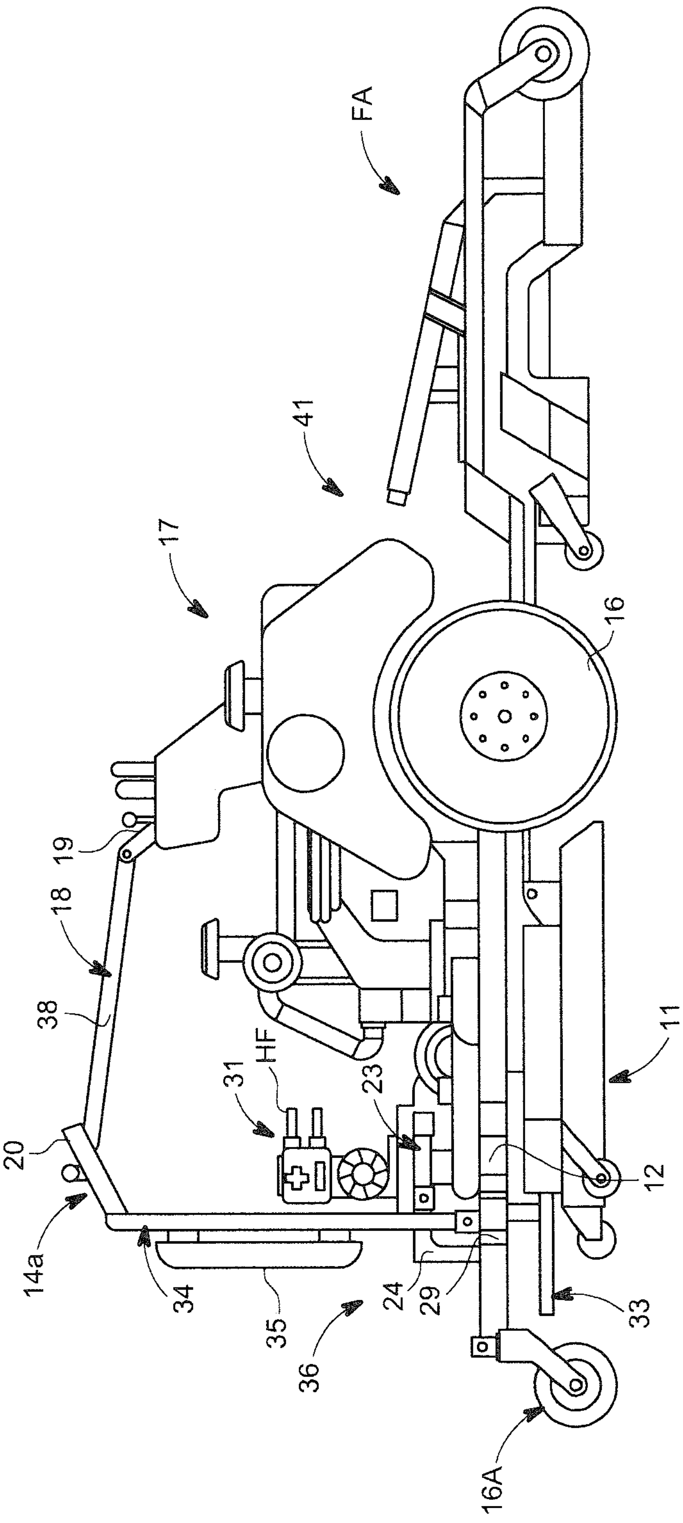
FIG. 2 is a side elevational view of a converted zero turn lawncare equipment vehicle having direction control reversal and front equipment attachment capabilities.
Figure 7:
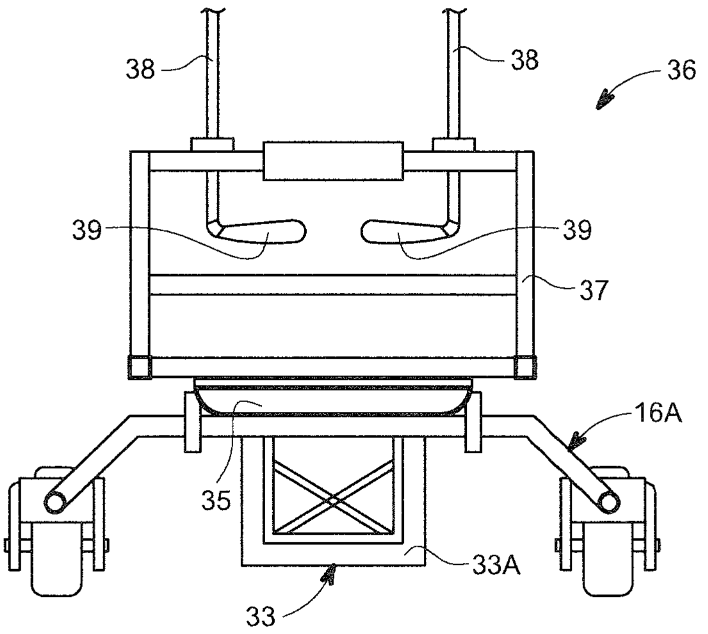
FIG. 7 is a top plan view of a custom remote adaption assembly for a lawncare vehicle drive and directional steering.
Figure 8:
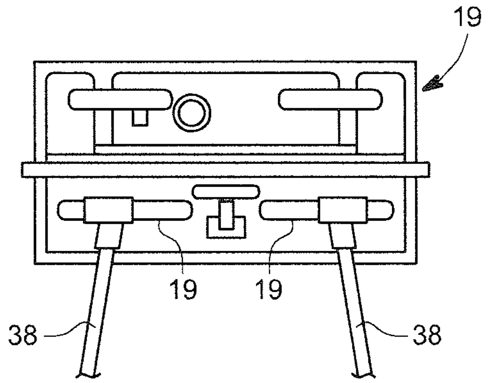
FIG. 8 is a top plan view of a custom vehicle control assemblies' remote attachment to a conventional steering and drive assembly.

The method of the invention effectively converts the conventional rear drive zero turn standing lawn mower equipment 10 into a reverse directional controlled converted lawncare equipment 17 as seen in FIG. 2 of the drawings. The converted lawncare equipment 17 has repositioned the operator's controls 14A by, in this example, control rod extension assembly 18 that has a simple mechanical linking attachment to the respective independent speed and directional control levers 19 as seen in FIGS. 2, 7 and 8 of the drawings so as to be positioned on the original front of the lawncare machine between the front caster wheels 17. It will be apparent that other vehicle control relocation methodologies may be used such as drive by wire and remote throttle control as will be well known in the art.

It will be seen by the reorientation of the equipment drive and steering controls now at 20, the rear drive wheels 16 become effectively front drive and steering wheels. The operator's controls also includes main engine throttle as noted and relocation of deck deployment as well as operational controls for front mounted attachments FA as will be described in greater detail hereinafter.

Figure 3:
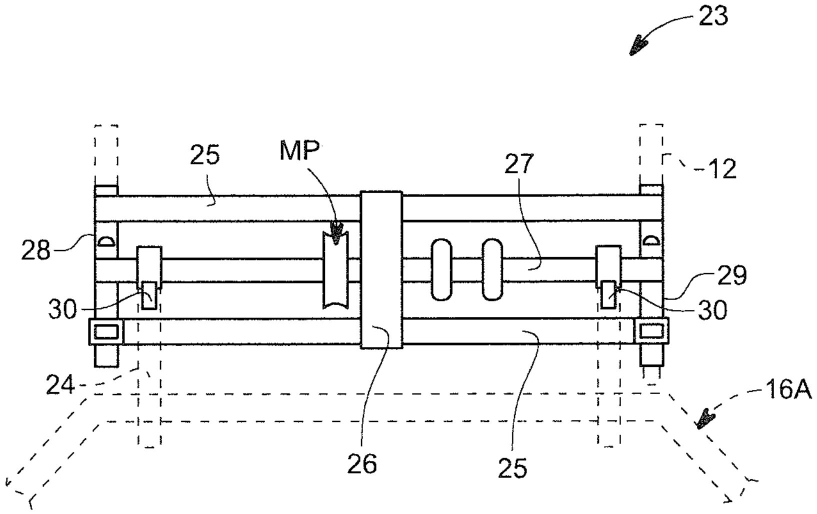
FIG. 3 is an enlarged top plan view of a custom front adaptive conversion assembly with caster wheels shown in broken lines.
Figure 4:
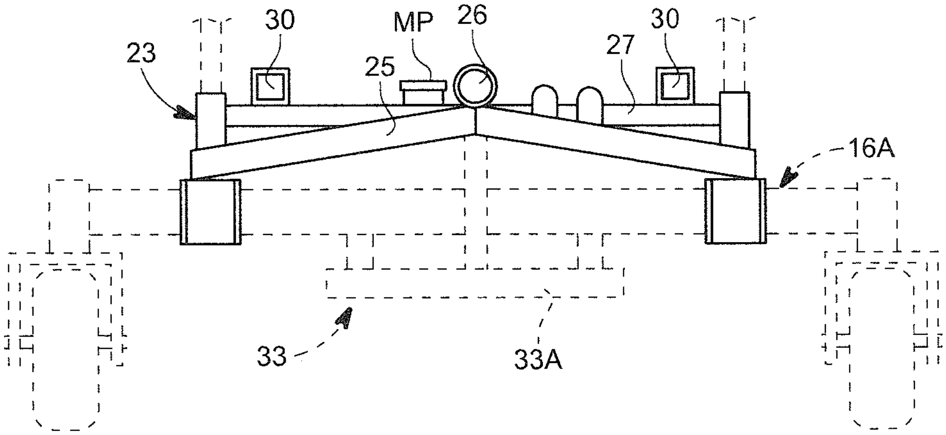
FIG. 4 is a front elevational view thereof.

The repositioning of the operator's controls and operator's stand 15 reorientation requires a custom mounting bracket assembly 23, best seen in FIGS. 1, 3 and 4 of the drawings. The conversion method described requires the remounting and modification of the caster wheel assembly 16A with the addition of L-shaped support extensions 24 as will be described in detail hereinafter.

The mounting bracket assembly 23 has spaced parallel frame supports 23A with a pair of angularly disposed cross spaced parallel tubular members 25 with an axle pivot 26 interconnecting same. An intermediate tubular support member 27 is positioned between, as best seen in FIG. 3 of the drawings. Pairs of oppositely disposed vehicle main frame saddle engagement mounting brackets 28 and 29 extend from the frame support 23A of the bracket assembly 23 and secure same to the equipment frame 12 corresponding pairs of fasteners F, in this example.

Figure 5:
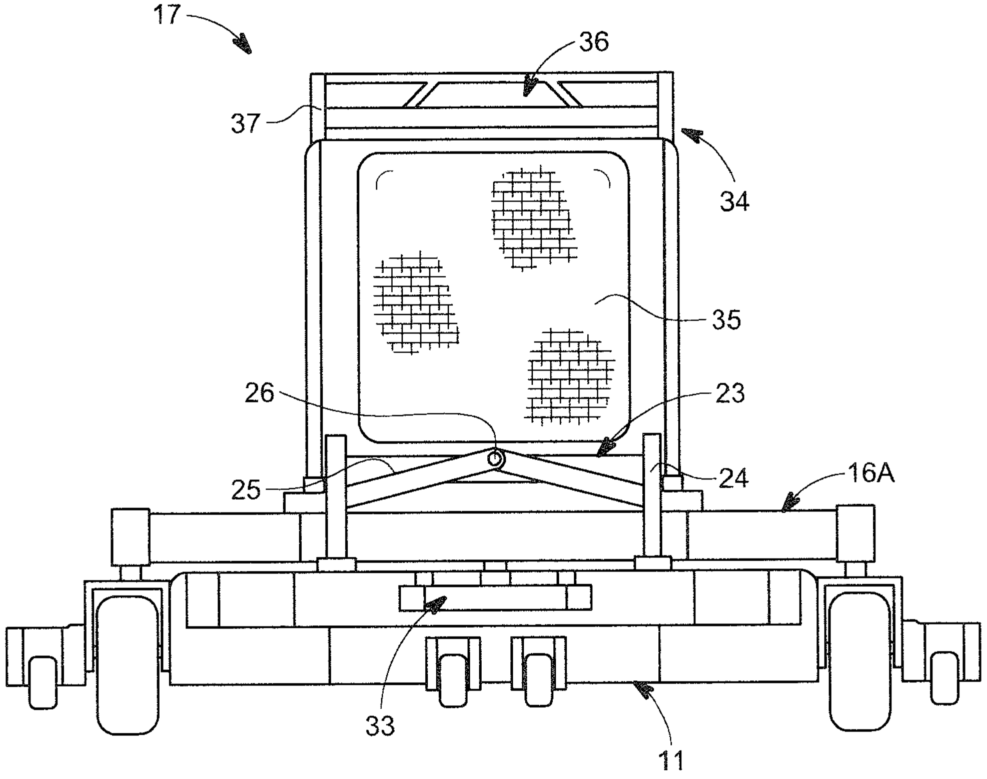
FIG. 5 is a front elevational view thereof mounted on a conventional lawncare zero turn vehicle for direction and adaptive conversion.

The caster wheels 16A L-shaped extensions 24 are registerably secured to the bracket extensions 30 on the support member 27, best seen in FIGS. 1 and 5 of the drawings. The custom mounting bracket assembly 23 provides a mounting platform MP for an auxiliary hydraulic power pump assembly 31 which may be used to supply power, needed operational as required, in the application chosen.

The power operable aspects required in this conversion are inclusive of a variety of front mounted power attachments FA. It will also be evident that alternate auxiliary attachment power source may be provided such as hydrostatic gear pumps 31A illustrated in broken lines in FIG. 11 of the drawings driven directly from the existing hydrostatic wheel pumps 16A.

A repositioned operator's platform 33 is secured to and extends from the mounting bracket assembly 23 having a rectangular frame 33A and is positioned between the caster wheel assemblies 16A.

Figure 6:
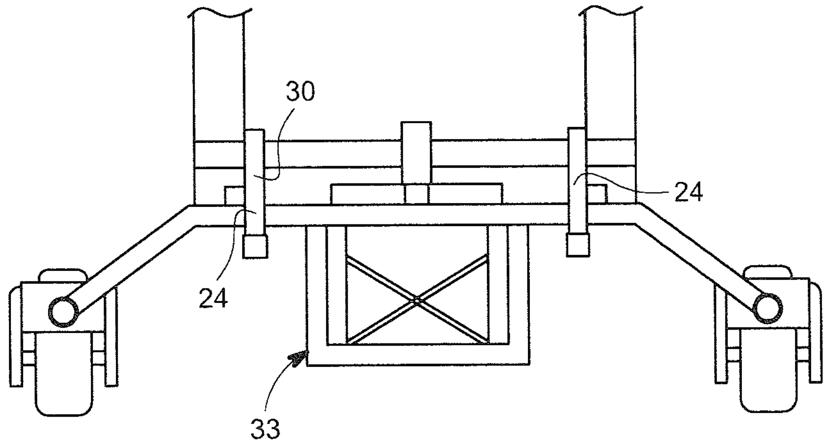
FIG. 6 is a partial top plan view thereof.

An operator's positional frame 34 has a vertical pad 35 and extends, as seen in FIGS. 2 and 5 of the drawings, to define the relocated operator's control position configuration at 36, now at the new back of the machine as illustrated in FIGS. 2, 5 and 6 of the drawings. The operator's controls configuration 36 has a frame 37 with brackets extending for a pair of control rods 38 that, in this example, selectively engage power and drive wheel directional control handles 39 on the converted vehicle 17. It will be evident that relocation of an engine throttle control and hydraulic lift control, not shown, may be located within the relocated operator's control configuration 36 as required.

Figure 9:
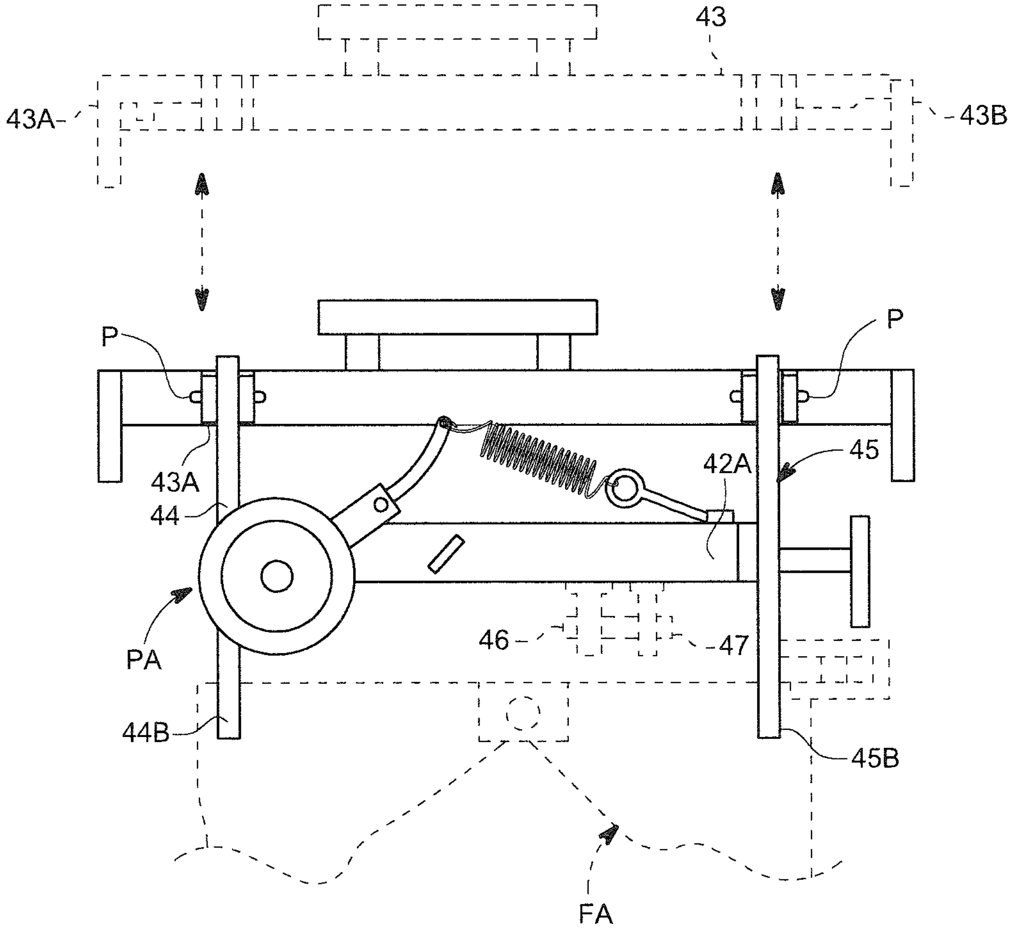
FIG. 9 is a top plan composite exploded view of a two-part custom front attachment drive assembly with a portion of a front attachment shown in broken lines.
Figure 10:
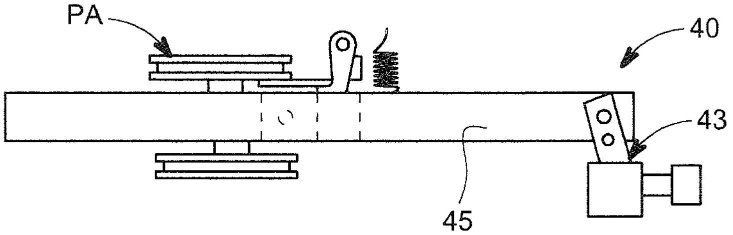
FIG. 10 is a side elevational view thereof as assembled.
Figure 11:
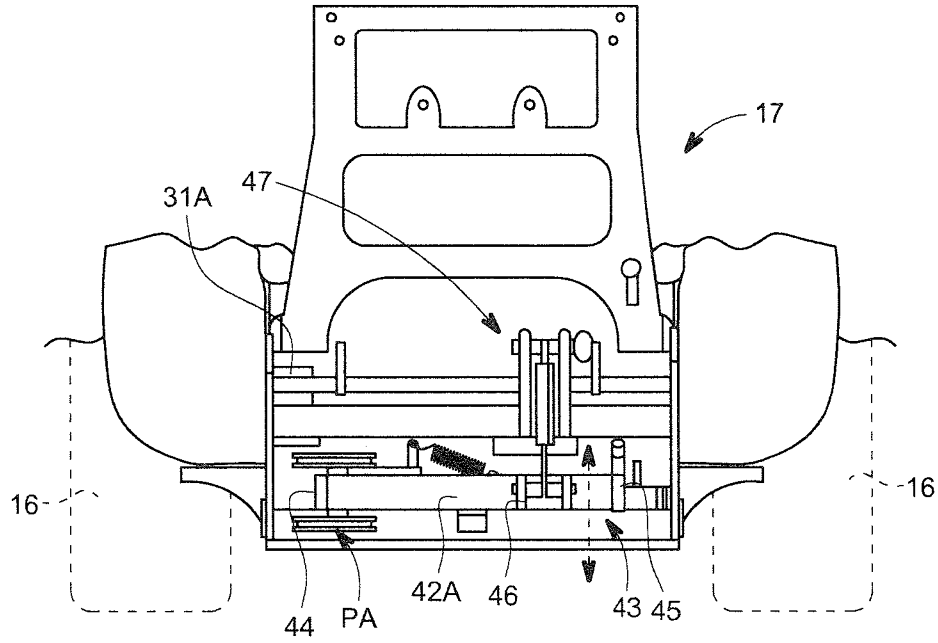
FIG. 11 is a rear elevational view of the custom front attachment drive assembly mounted on a lawncare vehicle with portions broken away for illustration.

Referring now to FIGS. 9 and 11 of the drawings, a custom front equipment mounting attachment assembly 40 can be seen secured to the newly defined equipment front at 41 of the converted lawncare equipment configuration 17. The equipment attachment mounting assembly 40 has a two-part configuration, as seen best in FIG. 9 of the drawings, with a dual pulley frame 42 and a vehicle frame mounting bracket 43. The dual pulley frame 42 has a main frame element 42A with oppositely disposed extending mounting arms 44 and 45 on its respective ends. A power take-off pulley assembly PA is secured to the pulley frame 42.

A hydraulic lift cylinder attachment bracket 46 is provided for a lift piston and cylinder assembly 47 extending from the main frame 12 cross member as seen in FIG. 11 of the drawings.

The vehicle frame mounting bracket 43 has a pair of spaced oppositely disposed apertured attachment brackets 43A and 43B which are secured by respective pins P with the corresponding apertured ends of the mounting arms 44 and 45 allowing the assembly to be secured to the vehicle's main frame, as noted.

The respective oppositely disposed free arm ends 44B and 45B provide for mounting of commercially available selective front end attachments FT illustrated in FIG. 2 of the drawings and shown in broken lines in FIG. 9 of the drawings.

It will be evident from the above description that a method and apparatus to convert a rear drive zero turn lawncare vehicle that changes the operational and directional orientation allowing for the utilization of a variety of different front attachments FT to the converted "front" of the lawncare equipment 17 as seen in FIG. 2 of the drawings.

The method steps include modifying the original caster assembly 16A of a conventional zero turn lawncare equipment 10, securing the custom mounting bracket assembly 23 to the front frame 12 portion of the lawncare equipment 10, selectively securing a hydraulic pump assembly 31 with quick connect hydraulic hose fittings HF which may include an electric drive motor depending on operational equipment requirements.

The steps further include relocating the operator's controls by extension rod links 38 for control or drive by wire configurations, not shown, known in the art, to the front of the converted zero turn lawncare equipment vehicle as shown in 17.

Providing an operator platform 33 and support rest pad 35 from the frame between the original remounted caster wheel assembly 16A.

An additional step includes securing a custom front equipment mount and attachment assembly 40 for the utilization for a variety of front attachments FA at the newly defined front 41 of the converted lawncare vehicle 17. Front attachments FA may include power driven snowblower, snow blade, leaf blower, power broom, all well developed and known in the art.

The custom front attachment mounting assembly 40 has a front attachment power take off pulley assembly PA, independent attached hydraulic cylinder lift bracket configuration 46 for selective power front attachments.

Providing remote control of the vehicle's operating configurations via relocation of throttle control attachment lift control and other equipment controls as hereinbefore described will provide numerous advantages by maintaining, in this example, the original under frame deck 11 as to balance and usability.

It will thus be seen that a new and novel conversion method and operational configuration has been illustrated and described for converting a conventional zero turn lawncare equipment 10 to a reverse directional lawncare equipment 17 for the attachment of front-end equipment while maintaining the advantage of zero turning configurations.

I claim:

1. A method for converting a conventional rear-drive zero turn lawn care equipment vehicle into a converted zero turn lawncare equipment vehicle, comprising:

installing a mounting bracket assembly onto a forward portion of a frame of the conventional rear-drive zero turn lawncare equipment vehicle;

relocating an operator stand from a rear portion of the frame to the mounting bracket assembly towards the forward portion of the frame;

providing a support rest pad at the mounting bracket assembly;

providing a second set of operator controls on the mounting bracket assembly;

connecting the second set of operator controls to a speed and directional control levers of the conventional rear-drive zero turn lawn care equipment vehicle positioned towards the rear portion of the frame through a control rod extension assembly, such that an operator positioned at the forward portion of the frame can access and actuate the speed and directional control levers through the second set of operator controls, wherein the speed and directional control levers are operatively connected to hydrostatic wheel pumps of the conventional rear-drive zero turn lawn care equipment vehicle to drive rear drive wheels of the conventional rear-drive zero turn lawn care equipment vehicle;

reconfiguring operation of the rear drive wheels of the conventional rear-drive zero turn lawn care equipment vehicle such that the rear drive wheels function as front drive and steering wheels of the converted lawncare equipment vehicle while maintaining zero-turn steering capability;

securing an auxiliary hydraulic power pump assembly onto the mounting bracket assembly towards the forward portion of the frame; and providing a vehicle frame mounting bracket towards a front of the converted lawncare equipment vehicle and connecting a front equipment mount and attachment assembly to the converted lawn care equipment vehicle via the vehicle frame mounting bracket, wherein the auxiliary hydraulic power pump assembly comprises a hydrostatic gear pump configured to supply pressurized hydraulic fluid to power the front equipment mount and attachment assembly independently of the hydrostatic wheel pumps.

2. The method of converting set forth in claim 1, wherein the mounting bracket assembly comprises, spaced parallel frame support members with a pair of angularly disposed cross spaced parallel tubular members with an axle pivot interconnecting the same, and pairs of saddle frame engagement mounting brackets extending from said frame support members for securing the mounting bracket assembly to said lawn care equipment frame.

3. The method of converting set forth in claim 1 wherein providing the front equipment mount and attachment assembly further comprises, installing a dual pulley frame, mounting arms extending from the vehicle frame mounting bracket, and a power take-off dual pulley frame assembly secured thereto.

4. The method of converting set forth in claim 3 wherein said dual pulley frame comprises, drive pulleys for rotational power transfer to said front power attachments.

5. The method of converting set forth in claim 1 wherein the front equipment mount and attachment assembly further comprises, a hydraulic attachment lift cylinder extending from said main frame of the lawn care vehicle to said power take-off dual pulley frame.

6. The method of converting set forth in claim 1 wherein modifying said front caster wheel assemblies comprises, positioning and attaching L-shaped upstanding support extensions thereto.

7. The method of converting set forth in claim 1, wherein an under-frame mower deck of the conventional rear-drive zero-turn lawn care equipment vehicle is retained in addition to the front equipment mount and attachment assembly.

* * * * *